United States Patent [19]

Howman

[11] Patent Number: 5,186,963

[45] Date of Patent: Feb. 16, 1993

[54] THERAPEUTIC DIETARY COMPOSITION CONTAINING AMARANTH

[76] Inventor: Karen Howman, 733 Cedar Run, Waldorf, Md. 20603

[21] Appl. No.: 817,644

[22] Filed: Jan. 7, 1992

[51] Int. Cl.$^5$ ............................ A23J 1/14; A23L 2/38
[52] U.S. Cl. ...................................... 426/72; 426/629; 426/801
[58] Field of Search .................. 426/801, 549, 629

[56] References Cited

U.S. PATENT DOCUMENTS

| | | | |
|---|---|---|---|
| 3,901,979 | 8/1975 | Nagasawa | 426/801 |
| 4,013,799 | 3/1977 | Smalligan | 426/801 |
| 4,617,190 | 10/1986 | Montgomery | 426/801 |
| 4,670,285 | 6/1987 | Clandinin | 426/801 |
| 4,830,861 | 5/1989 | Puski | 426/801 |
| 4,911,943 | 3/1990 | Slimak . | |
| 4,990,344 | 2/1991 | Euber | 426/801 |
| 5,021,245 | 6/1991 | Borshel | 426/801 |
| 5,069,923 | 12/1991 | Hubbard | 426/445 |

FOREIGN PATENT DOCUMENTS

| | | | |
|---|---|---|---|
| 58-165742 | 9/1983 | Japan . | |
| 2226569 | 7/1990 | United Kingdom | 426/801 |

*Primary Examiner*—Carolyn Paden
*Attorney, Agent, or Firm*—Richard C. Litman

[57] ABSTRACT

A high potency dietary composition for treating patients suffering from malnutrition and other related disorders. The dietary compositions comprise sufficient protein, fat, carbohydrate, vitamins, minerals and trace elements to meet the nutritional requirements of the patient, wherein the protein ingredient is derived from amaranth. The amaranth content and proportions of other nutrients of the compositions can be varied, depending on the particular condition to be treated, to provide better patient tolerance and a lower incidence of side effects. The amaranth-containing dietary compositions are suitable for use by low birthrate infants, malnourished children suffering from a nutrient deficiency, as well as by adult patients having a chronic illness.

12 Claims, No Drawings

THERAPEUTIC DIETARY COMPOSITION CONTAINING AMARANTH

BACKGROUND OF THE INVENTION

1. Field of the Invention

The present invention relates to a high potency dietary composition for the treatment of malnutrition and other related diseases. More particularly, this invention pertains to nutritionally complete dietary compositions containing amaranth which are suitable for use by low birthrate infants, malnourished children suffering from a nutrient deficiency, as well as by adult patients having a gastrointestinal disease or chronic illness.

2. Description of the Prior Art

A deficiency of protein causes the malnutrition disease kwashiorkor which is usually seen in children in the postweaning years, ages 1 to 4. The classic syndrome of kwashiorkor is one of retarded growth and development with mental apathy, edema and muscular wasting. Marasmus is another such disease that occurs mainly in children and is caused by chronic dietary undernutrition, both of protein and kilocalories. This disease is most common in infants 6 to 18 months of age and is characterized by gross underweight. There is atrophy of both muscle mass and subcutaneous fat, giving its victims an almost cadaverous appearance. Growth rate declines progressively in marasmus victims, emotional impairment is also present, and diarrhea is common.

Treatment for these nutritional deficiency diseases usually involves immediate therapy and follow-up care during the first 24 hours of therapy. Correction of water and potassium depletion takes priority, especially if diarrhea and consequent dehydration have been severe. Diuresis occurring after about 7 days of treatment indicates a favorable response to initial therapy. Thereafter, the kilocalorie content of the diet is increased by the addition of mixed foods that supply sufficient vitamins and minerals. However, kwashiorkor and marasmus usually occur in underdeveloped regions of the world where socioeconomic factors combine to make nutritious food products unavailable to the child.

Deficiency-related diseases may also occur in United States hospitals among patients with long-term illnesses, who often lose their ability to ingest normal amounts of food products necessary to maintain adequate nutritional levels. Typical of such seriously ill patients are those having gastrointestinal diseases or various oroesophageal cancers, strokes, neuromuscular dystrophy and Parkinson Disease. Many cancer therapy routines, for example, require periods of abstinence and other therapies cause nausea and vomiting which result in the interruption of a patient's normal eating habits. Obviously, such patients are at risk of dehydration and eventually become malnourished. Resort must be made to some form of diet therapy in order to sustain these patients. Feeding by enteral hyperalimentation is usually the treatment of choice since it produces fewer side effects than the introduction of nutrients directly into a vein. However, compositions presently marketed for enteral hyperalimentation generally have a low fat content and contain less than 2 Kcal/ml, which are insufficient to reverse the effects of severe malnutrition. These low fat compositions preclude higher intakes of kilocalories because of volume limitations and are not well tolerated by many seriously ill patients.

In addition, many low birthweight infants and especially preterm infants are unable to tolerate proprietary infant foods in which the protein source is derived from milk products. Since milk is an importance source of riboflavin, the lower the protein intake, the more riboflavin is excreted and loss. Also, the condition of hyperbilirubinaemia is quite commonly encountered in preterm infants. Newborn infants with this condition have shown signs of riboflavin deficiencies even when supplements were provided. Because riboflavin is sensitive to light, considerable loss can occur when infants with hyperbilirubinaemia are treated by phototherapy.

The survival rate of premature or preterm infants has increased dramatically in recent years and the substantial percentage of deaths occurring among children and adults due to poor nutrition and related causes has been a major worldwide concern. There is, therefore, an imminent need for alternatives to therapeutic diets that may be made available to world populations and are capable of meeting the nutritional requirements of low birthweight infants and other malnourished individuals, without imposing metabolic stress.

In U.S. Pat. No. 4,911,943 to Slimak there is disclosed a variety of different food products prepared from amaranth which serve as substitutes for grains, eggs and milk. In a particular embodiment, this patent describes an infant formula consisting essentially of amaranth flour and water. However, the nutritional requirements of preterm infants, for example, are unique and are not satisfied by feeding such infants with foods formulated with the needs of normal birthweight infants in mind.

SUMMARY OF THE INVENTION

It is, accordingly, a primary object of the present invention to provide a high potency dietary composition for the treatment of malnutrition and other deficiency-related diseases.

It is another object of the invention to provide a infant food which is specifically formulated to meet the nutritionally requirements of low birthweight infants and more particularly preterm infants without causing metabolic stress.

It is a further object of the invention to provide a nutritionally complete dietary composition for enteral feeding which is capable of use in patients having a chronic illness in order to reverse the effects of malnutrition without causing side effects.

Briefly, these and other objects are accomplished in accordance with the present invention which provides improved high potency dietary compositions specially formulated for treating certain malnourished patients comprising sufficient protein, fat, carbohydrate, vitamins and minerals to meet the nutritional requirements of the patient, wherein the total protein content of the composition is derived from amaranth. The present amaranth-based compositions are thus nutritionally complete therapeutic diets capable of use in malnourished adults as well as infants. The amaranth content and proportions of other nutrients of the compositions can be varied, depending on the condition to be treated, to provide better patient tolerance and a lower incidence of side effects.

The forgoing and other features, advantages and objects of the invention may be more fully appreciated by reference to the following detailed description.

DETAILED DESCRIPTION OF THE PREFERRED EMBODIMENTS

In accordance with the present invention, the dietary compositions are formulated from processed amaranth seeds, cooked and uncooked meals or flours and other species of the Amaranthaceae family. While various species of amaranth seeds are known to exist throughout the world, those generally containing about 10-20% protein, 1-10% fat and about 60-70% parts by weight carbohydrate are preferably used for purposes of this invention.

Amaranth seeds may first be reduced to flakes or a coarse to fine powder by grinding, pulverizing and the like to produce a particulate material with substantially all the nutrient components of the seed remaining in the product. Alternatively, the conventional step of toasting or popping the amaranth seeds prior to reducing them to uniform particles has been found to significantly improve digestibility of the resulting products. The particulate product may then be combined with water in relative proportions of from about 1:3 to 1:10 and cooked under conditions suitable to form a homogeneous fluid or paste.

Approximately 60 gms of cooked amaranth, processed as set forth hereinabove, contain about 200 calories; 8 gms of protein; about 35 gms carbohydrate; and 3 gms fat. This fluid mixture may be adjusted to the appropriate consistency before the addition of individual nutrients. Preferably, the amaranth mixture is dried by any suitable means and pulverized to a fine powder for storage, prior to adding the remaining nutrient components of the present dietary compositions.

In accordance with one embodiment of the invention, the present compositions when formulated to satisfy the dietary requirements of low birthrate and preterm infants preferably provide 65 to 85 Kcal of energy and contain about 10.0 to 30.0 g of amaranth protein, 4.0 to 5.5 g of fat and 6.0 to 9.0 g of carbohydrate per 100 ml. The amaranth component consists of all eight essential amino acids, including a high amount of lysine which is indispensable for controlling protein absorption. Its high nutritional value and quality is matched only that of whole milk and this ingredient conveniently provides 100% of the total protein content of the present infant composition. The protein, fat and carbohydrate components all contribute to the energy requirements of preterm babies who generally grow better and are less metabolically stressed when fed the present diet food in which the protein source is derived exclusively from amaranth.

The fat portion of the present infant dietary composition is preferably contributed by vegetable oils due to their ready availability, ease of formulation, absence of cholesterol and lower concentration of saturated fatty acids. Typical vegetable oils suitable for use in the composition of the present embodiment are those such as corn oil, sunflower oil and soybean oil. Partially hydrogenated fats may also be utilized.

The digestion or absorption of fat is less efficient in low birthrate and preterm infants because of immature digestive functions. Fat utilization can be improved by additionally including in the fat portion of the present composition, a proportion of dietary fat in the form of a medium-chain triglyceride, e.g., fractionated peanut oil. Good digestibility resulted when medium-chain triglycerides represented about 50% of the fat intake.

The carbohydrate portion of the infant food of the present invention makes an important contribution to the energy requirement and is typically sugars, which would include such food substances as sucrose, maltose or edible lactose. Also suitable for use are fructose, glucose, corn syrup, malodextrin, and polysaccharides.

The infant foods of the invention preferable include vitamins and minerals in amounts generally equivalent or greater to those present in human milk on an energy or per calorie basis. Typically, vitamins A, $B_1$, $B_2$, $B_6$, $B_{12}$, C, D, and E, folic acid, niacinamide, biotin, calcium, phosphorus, sodium, potassium, chloride, magnesium, manganese, copper, zinc and iodine. While iron is usually included in infant food formulations for low birthrate infants, this trace element is advantageously excluded as an added ingredient since the amaranth component of the present composition supplies the recommended amount of iron.

In accordance with another embodiment of the invention, the present compositions when formulated as a complete therapeutic diet especially for enteral feeding preferably provide about 250 to 350 Kcal of energy and contain about 40.0 to 70.0 g of amaranth protein, 10.0 to 30.0 g of fat and about 150.0 to 200.0 g of carbohydrate per 100 ml. These high caloric formulations additionally contain such vitamins and minerals in amounts sufficient to fulfill the recommended daily allowances of children and adults when ingested in a 24 hour period. The present formulations are thus nutritionally complete dietary compositions capable of use in malnourished and chronically ill patients.

Typically, the patient will best be fed about 1.5 liters/24 hour period of the composition of the present embodiment administered by enteral hyperalimentation. This will generally provide about 3500-5000 Kcal per day, which will not only sustain the patient but, in most cases, provide sufficient calories to afford a desirable weight gain.

The fat and carbohydrate portions of present compositions may be contributed by those corresponding components set forth hereinabove. However, where animal fats such as lard or butter are available, these components may be used since they have substantially the same caloric and nutritional values as fats from a vegetable source. Also, since the patient to be treated usually has a compromised absorption function, the addition of a medium-chain triglyceride is recommended to improve the digestion of the fat. The medium-chain triglycerides can represent as much as 75 to 225 g of the daily fat intake.

The concentrations of vitamins and minerals in the high caloric compositions of the present invention can be adjusted in any appropriate manner so that the patient's recommended daily allowances will be met. Generally, the amounts included are somewhat less than prior art formulations of this type since larger volumes of the present compositions are better tolerated.

The dietary compositions comprising the embodiments of the present invention is prepared by conventional techniques and can be obtained as a ready-to-use formula by mixing the individual nutrients. Water may be included as an aqueous medium for the nutrients providing the energy requirements set forth hereinabove within the appropriate fluid volumes. More particularly, the processed amaranth-protein component can be dissolved in the water and the remaining ingredients can then be added to the solution and homogenized. When adding the fat component, vigorous blending with the other components, preferably using a laboratory or commercial homogenizer, should be made to ensure a physically stable fluid having a suitable shelf life. This liquid composition can then be filled into any suitable container and appropriately sealed for storage.

The dietary compositions of the present invention can be sterilized in accordance with conventional practice and also stored as concentrates or in substantially solid form. The concentrates or solid can be obtained by drying the liquid compositions prepared as indicated above using such convenient methods as evaporation and spray-drying. These products can be reconstituted by adding an appropriate volume of sterile water prior to use.

The following specific examples is given to further illustrate the present invention, wherein amounts of ingredients are specifically indicated.

EXAMPLE 1

A liquid composition formulated to satisfy the dietary requirements of preterm infants was prepared according to the procedure as described hereinabove by mixing the following ingredients:

|  | Amounts per 100 mls |
| --- | --- |
| Protein (Amaranth flour) | 30.0 g |
| Carbohydrate (Lactose) | 8.0 g |
| Fat (Corn oil/medium chain triglycerides) | 5.0 g |
| Vitamin A | 175 units |
| Vitamin D | 250 units |
| Vitamin E | 6 units |
| Vitamin $B_1$ (Thiamine HCl) | 0.13 mg |
| Vitamin $B_2$ (Riboflavin) | 0.05 mg |
| Vitamin C (Ascorbic Acid) | 7.50 mg |
| Vitamin $B_6$ (Pyridoxine HCl) | 0.05 mg |
| Vitamin $B_{12}$ (Cyanocobalamin) | 0.04 mg |
| Niacinamide | 0.60 mg |
| Folic Acid | 6.25 mg |
| Calcium | 25 mg |
| Phosphorus | 30 mg |
| Chloride | 35 mg |
| Sodium | 15 mg |
| Potassium | 6.25 mg |
| Magnesium | 7.50 mg |
| Copper | 0.40 mg |
| Zinc | 0.40 mg |
| Iodine | 4.50 mg |
| Water | to 100 ml volume |

The above infant food composition provides about 85 Kcal per 100 ml volume and can be used with particular advantage for the nourishment of both healthy and low birthrate infants, as well as preterm infants. This infant food can be fed by any appropriate method, but in general will be fed enterally by a nasogastric tube.

EXAMPLE 2

A high caloric dietary composition formulated is prepared using the following ingredients:

|  | Amounts per 1000 mls |
| --- | --- |
| Protein (Amaranth flour) | 60.0 g |
| Carbohydrate (Corn syrup) | 165.0 g |
| Fat (Corn oil/medium chain triglycerides) | 1000.0 g |
| Vitamin A | 5000 units |
| Vitamin D | 400 units |
| Vitamin E | 60 units |
| Vitamin $B_1$ (Thiamine HCl) | 3 mg |
| Vitamin $B_2$ (Riboflavin) | 3 mg |
| Vitamin C (Ascorbic Acid) | 300 mg |

-continued

|  | Amounts per 1000 mls |
| --- | --- |
| Vitamin $B_6$ (Pyridoxine HCl) | 3 mg |
| Vitamin $B_{12}$ (Cyanocobalamin) | 12 mcg |
| Vitamin K | 200 mcg |
| Niacinamide | 40 mg |
| Calcium | 50 mg |
| Phosphorus | 1 g |
| Magnesium | 400 mg |
| Copper | 2 mg |
| Zinc | 15 mg |
| Iodine | 150 mg |
| Water | to 1000 ml volume |

The above diet contains about 3600 Kcal per 1000 ml volume is indicated for malnourished children and patients with limited tolerance for dietary volume. This composition can best be administered via a feeding tube for most patients requiring enteral hyperalimentation.

This composition can also be taken orally as a concentrate when used as a high caloric supplement to improve the intake of nutrients. The bland taste of the composition can be improved by the addition of artificial flavorings.

It should be understood that there may be various changes and modifications of the representative embodiments herein selected for purposes of illustration without departing from the spirit and scope of the invention. Accordingly, the foregoing examples art not to be interpreted as restrictive of the invention beyond that necessitated by the following claims.

I claim:

1. An infant food composition for use in the feeding of low birthrate infants which provides 65 to 85 Kcal of energy and comprises about 10.0 to 30.0 g of amaranth protein, 4.0 to 5.5 g of fat, 6.0 to 9.0 g of carbohydrate per 100 ml, and vitamins and minerals in amounts generally equivalent to or greater than those present in human milk on a per calorie basis, whereby the nutritional needs of said infants are met without imposing metabolic stress.

2. The composition according to claim 1 wherein the amaranth protein is a finely powdered, precooked amaranth flour.

3. The composition according to claim 1 wherein said vitamins and minerals are selected from the group consisting of vitamins A, $B_1$, $B_2$, $B_6$, $B_{12}$, C, D, and E, folic acid, niacinamide, biotin, calcium, phosphorus, sodium, potassium, chloride, magnesium, manganese, copper, zinc and iodine.

4. The composition according to claim 1 wherein said fat is a vegetable oil selected from the group consisting of corn oil, sunflower oil and soybean oil.

5. The composition according to claim 4 wherein the fat component includes medium-chain triglycerides.

6. The composition according to claim 1 wherein said carbohydrate is selected from the group consisting of sugar, sucrose, maltose, lactose, fructose, glucose, corn syrup and malodextrin.

7. A high caloric, nutritionally complete therapeutic diet formulation suitable for use in malnourished and chronically ill patients which provides about 250 to 350 Kcal of energy and comprises about 40.0 to 70.0 g of amaranth protein, 10.0 to 30.0 g of fat, about 150.0 to 200.0 g of carbohydrate per 100 ml, and vitamins and minerals in amounts sufficient to fulfill the recommended daily allowances of said patients when ingested in a 24 hour period.

8. The formulation according to claim 1 in the form of a liquid which is administered by enteral feeding.

9. The formulation according to claim 1 wherein said vitamins and minerals are selected from the group consisting of vitamins A, $B_1$, $B_2$, $B_6$, $B_{12}$, C, D, E and K, folic acid, niacinamide, biotin, calcium, phosphorus, sodium, potassium, chloride, magnesium, manganese, copper, zinc and iodine.

10. The formulation according to claim 1 wherein the fat component is a vegetable oil selected from the group consisting of corn oil, sunflower oil and soybean oil.

11. The formulation according to claim 10 wherein said fat component includes medium-chain triglycerides.

12. The formulation according to claim 7 wherein the carbohydrate component is selected from the group consisting of sugar, sucrose, maltose, lactose, fructose, glucose, corn syrup and malodextrin.

* * * * *